(12) United States Patent
Almassy et al.

(10) Patent No.: US 8,655,189 B2
(45) Date of Patent: Feb. 18, 2014

(54) OPTICAL MODULATION UTILIZING STRUCTURES INCLUDING METAMATERIALS

(75) Inventors: Robert Joseph Almassy, Alexandria, VA (US); Anthony Bresenhan Kaye, Herndon, VA (US); Thomas Matthew Fletcher, Loveland, OH (US)

(73) Assignee: Exelis, Inc., McLean, VA (US)

( * ) Notice: Subject to any disclaimer, the term of this patent is extended or adjusted under 35 U.S.C. 154(b) by 610 days.

(21) Appl. No.: 12/818,710

(22) Filed: Jun. 18, 2010

(65) Prior Publication Data

US 2011/0311234 A1    Dec. 22, 2011

(51) Int. Cl.
*H04B 10/04*    (2011.01)
*H04B 10/00*    (2013.01)

(52) U.S. Cl.
USPC ........... 398/201; 398/169; 398/170; 398/182; 359/288; 359/289

(58) Field of Classification Search
USPC ........... 398/169, 170, 182, 201; 359/288, 289
See application file for complete search history.

(56) References Cited

U.S. PATENT DOCUMENTS

| | | | |
|---|---|---|---|
| 4,283,113 A * | 8/1981 | Eden | 385/18 |
| H461 H * | 4/1988 | Wert, III | 359/263 |
| 5,121,242 A | 6/1992 | Kennedy | |
| 5,608,568 A * | 3/1997 | Blodgett et al. | 359/288 |
| 6,154,299 A | 11/2000 | Gilbreath | |
| 6,172,795 B1 | 1/2001 | Carlson | |
| 6,344,846 B1 | 2/2002 | Hines | |
| 6,605,260 B1 | 8/2003 | Busted | |
| 6,624,916 B1 | 9/2003 | Green | |
| 6,906,842 B2 | 6/2005 | Agrawal et al. | |
| 6,954,302 B2 | 10/2005 | Sayyah | |
| 7,054,563 B2 | 5/2006 | Tsumura | |
| 7,142,348 B2 | 11/2006 | Sayyah | |
| 7,173,426 B1 | 2/2007 | Bulumulla | |
| 7,308,202 B2 | 12/2007 | Roes | |
| 7,317,566 B2 | 1/2008 | Tench | |
| 7,317,876 B1 | 1/2008 | Elliott | |

(Continued)

FOREIGN PATENT DOCUMENTS

EP    1 295 169 B1    6/2008

OTHER PUBLICATIONS

J.Y. Suh, et al., "Modulation of the Gold Particle-Plasmon Resonance by the Metal-Semiconductor Transition of Vanadium Dioxide", Journal of Optics, 2008, pp. 1-6.*

(Continued)

*Primary Examiner* — Daniel Dobson
(74) *Attorney, Agent, or Firm* — Edell, Shapiro & Finnan, LLC

(57) ABSTRACT

An optical modulation system includes a metamaterial structure configured to receive and process an input optical signal at at least one operational wavelength, where the metamaterial structure changes between a transmissive state and a non-transmissive state with respect to the optical signal(s) at the operational wavelength(s) in response to an external stimulus applied to the metamaterial structure. An external stimulus source is coupled with the metamaterial structure and is configured to change the metamaterial structure between its transmissive and non-transmissive states by applying selected stimulus pulses to the metamaterial structure. The optical modulation system processes the input optical signal to output a modulated optical signal that modulates in correspondence with the selected pulses applied to the metamaterial structure.

23 Claims, 2 Drawing Sheets

(56) References Cited

U.S. PATENT DOCUMENTS

| | | | |
|---|---|---|---|
| 7,339,726 B2 | 3/2008 | Fathimulla | |
| 7,345,804 B1 | 3/2008 | Sayyah | |
| 7,446,929 B1* | 11/2008 | Jayaraman et al. | 359/299 |
| 7,471,454 B1 | 12/2008 | Sayyah | |
| 7,484,857 B2 | 2/2009 | Bozler | |
| 7,489,865 B2 | 2/2009 | Varshneya | |
| 7,603,041 B2 | 10/2009 | Varshneya | |
| 2002/0141029 A1* | 10/2002 | Carlson et al. | 359/244 |
| 2004/0179848 A1 | 9/2004 | Belenkii | |
| 2006/0179456 A1 | 8/2006 | Toyoshima | |
| 2007/0189779 A1 | 8/2007 | Murphy | |
| 2007/0273948 A1* | 11/2007 | Roes et al. | 359/222 |
| 2007/0297042 A1 | 12/2007 | Bifano | |
| 2007/0297805 A1 | 12/2007 | Rabinovich | |
| 2008/0273243 A1 | 11/2008 | Karasikov | |
| 2009/0073536 A1 | 3/2009 | Goetz | |
| 2009/0202254 A1 | 8/2009 | Majumdar | |
| 2009/0279903 A1 | 11/2009 | Roes | |
| 2009/0285583 A1 | 11/2009 | Winker | |
| 2009/0303592 A1 | 12/2009 | Oakley | |
| 2010/0309539 A1* | 12/2010 | Kaye et al. | 359/288 |
| 2011/0175047 A1* | 7/2011 | Ramanathan et al. | 257/2 |
| 2011/0205542 A1* | 8/2011 | Pendell Jones et al. | 356/445 |

OTHER PUBLICATIONS

E. Cavanna, et al, "Optical Switching of Au-Doped VO2 Sol-Gel Films", Materials Research Bulletin, vol. 34, No. 2, 1999, pp. 167-177.*

Sihai Chen, et al., "Phase Transition VO2 Thin Films for Optical Switches", Int'l. Journal of Infrared and Millimeter Waves, vol. 25, No. 1, Jan. 2004, pp. 157-163.*

European Search Report dated Sep. 30, 2011 received in corresponding EP11168076.5, 10 pages.

E.V. Babkin, et al., "Metal-Insulator Phase Transition in VO2: Influence of Film Thickness and Subtrate", Electronics and Optics, 1987, pp. 11-14.

B. Felde, et al., "Plasmon Excitation in Vanadium Dioxide Films", Elsevier, Thin Solid Films, 1997, pp. 61-65.

P. Jin, et al., "Tungsten Doping into Vanadium Dioxide Thermochromic Films by High-Energy Ion Implantation and Thermal Annealing", Elsevier, Thin Solid Films, 1998, pp. 151-158.

Ningyi Yuan, et al., "The Large Modification of Phase Transition Characteristics of VO2 Films on SiO2/Si Substrates", Elsevier, ScienceDirect, 2006, pp. 1275-1279.

Yan Jiazhen, et al., "Effect of Mo-W Co-doping on Semiconductor-Metal Phase Transition Temperature of Vanadium Dioxide Film", Elsevier, ScienceDirect, 2008, pp. 8554-8558.

Justyna K. Ganel, et al., "Gold Helix Photonoic Metamaterial as Broadband Circular Polarizer", Science AAAS, vol. 325, 2009, pp. 1513-1515.

T. Driscoll, et al., "Memory Metamaterials", Science AAAS, vol. 325, 2009, pp. 1518-1521.

Weiping Wang, et al., "Dynamic Optical Limiting Experiments on Vanadium Dioxide and Vanadium Pentoxide Thin Films Irradiated by a Laser Beam", Applied Optics, vol. 45. No. 14, May 10, 2006, pp. 3378-3381.

R. Lopez, et al., "Pulsed Laser Deposition of Conductive Metallo-Dielectric Optical Filters", Applied Physics, Dec. 20, 2001, pp. 307-310.

Mark Borek, et al., "Pulsed Laser Deposition of Oriented VO2 Thin Films on R-Cut Sapphire Substrates", Appl. Phys. Left., Dec. 13, 1993, pp. 3288-3290.

R. Lopez, et al., "Enhanced Hysteresis in the Semiconductor-to-Metal Phase Transition of VO2 Precipitates Formed in SiO2 by Ion Implantation", Appl. Phys. Lett., vol. 79, No. 19, Nov. 5, 2001, pp. 3161-3163.

Y. Muraoka et al., "Metal-Insulator Transition of VO2 Thin Films Grown on TiO2 (001) and (110) Substrates", Appl. Phys. Lett., vol. 80, No. 4, Jan. 28, 2002, pp. 583-585.

G.I. Petrov et al., "Raman Microscopy Analysis of Phase Transformation Mechanisms in Vanadium Dioxide", Appl. Phys. Lett., vol. 81, No. 6, Aug. 5, 2002, pp. 1023-1025.

R. Lopez et al., "Switchable Reflectivity on Silicon from a Composite VO2—SiO2 Protecting Layer", Appl. Phys. Lett., vol. 85, No. 8, Aug. 23, 2004, pp. 1410-1412.

J. Rozen et al., "Two-Dimensional Current Percolation in Nanocrystalline Vanadium Dioxide Films", Appl. Phys. Lett., Feb. 2006, pp. 1-3.

J.Y. Suh, et al., "Modulated Optical Transmission of Subwavelength Hole Arrays in Metal-VO2 Films", Appl. Phys. Lett., Mar. 2006, pp. 1-3.

I. Karakurt, et al., "Transmission Increase Upon Switching of VO2 Thin Films on Microstructured Surfaces", Appl. Phys. Lett., Aug. 2007, pp. 1-3.

Bong-Jun Kim, et al., "Temperature Dependence of the First-Order Metal-Insulator Transition in VO2 and Programmable Critical Temperature Sensor", Appl. Phys. Lett., Jan. 2007, pp. 1-3.

J.S. Lee, et al., "Time-Resolved Visualization of the Heat Flow in VO2/Ai2O3 Films", Appl. Phy. Lett., Jan. 2007, pp. 1-3.

Gang Xu, et al., Thickness Dependence of Optical Properties of VO2 Thin Films Epitaxcially Grown on Sapphire (0 0 0 1), Applied Surface Science, Jan. 2005, pp. 449-452.

S. Lysenko, et al., "Light-Induced Ultrafast Phase Transitions in VO2 Thin Film", Applied Surface Science, Jan. 2006, pp. 5512-5515.

Jesse H. Day, "Thermochromism of Inorganic Compounds", Chemical Reviews, vol. 68, No. 6, Nov. 25, 1968, pp. 649-657.

Feliks Chudnovskiy, et al., "Switching Device Based on First-Order Metal-Insulator Transition Induced by External Electric Field", Wiley Interscience, 2002, pp. 1-8.

O. Ya. Berezina, et al., "Metal-Semiconductor Transition in Nonstoichiometric Vanadium Dioxide Films", Inorganic Materials, 2007, vol. 43, No. 5, pp. 505-511.

Changhong Chen, et al., "Micromachined Uncooled IR Bolometer Linear Array Using Vo2 Thin Films", Int'l. Journal of Infrared and Millimeter Waves, vol. 22, No. 1, 2001, pp. 53-58.

P.J. Hood et al., "Millimeter-Wave Dielectric Properties of Epitaxial Vanadium Dioxide Thin Films", J. Appl. Phys. 70, Jul. 1, 1991, pp. 376-381.

Michael F. Becker, et al., "Femtosecond Laser Excitation Dynamics of the Semiconductor-Metal Phase Transition in VO2", J. Appl. Phys., Mar. 1, 1996, pp. 2404-2408.

J.H. Suh, et al., "Semiconductor to Metal Phase Transition in the Nucleation and Growth of VO2 Nanoparticles and Thin Films", Journal of Applied Physics, vol. 96, No. 2, Jul. 15, 2004, pp. 1209-1213.

S.A. Pauli, et al., "X-Ray Diffraction Studies of the Growth of Vanadium Dioxide Nanoparticles", Journal of Applied Physics, 2007, pp. 1-6.

A. Ilinski, et al., "Variations in Optical Reflectivity in the Semiconductor-Metal Phase Transition of Vanadium Dioxide", Journal of Non-Crystalline Solids, 2004, pp. 266-268.

M. Soltani, et al, "Micro-Optical Switch Device Based on Semiconductor-to-Metallic Phase Transition Characteristics of W-doped VO2 Smart Coatings", J. Vac. Sci. Tech., Jul./Aug. 2007, pp. 971-975.

M. Maaza, et al., "Direct Production of Thermochromic VO2 Thin Film Coatings by Pulsed Laser Ablation", Elsevier, Optical Materials, 2000, pp. 41-45.

M. Maaza, et al., "Thermal Induced Tunability of Surface Plasmon Resonance in Au—VO2 Nano-Photonics", Elsevier, Optics Communications, 2005, pp. 188-195.

Hongchen Wang, et al., "Fabrication of VO2 Films with Low Transition Temperature for Optical Switching Applications", Elsevier, Optics Communications, 2005, pp. 305-309.

T. Ben-Messaoud, et al., "High Contrast Optical Switching in Vanadium Dioxide Thin Films", Elsevier, Optics Communications, 2008, pp. 1-4.

R. Lopez, et al., "Temperature-Controlled Surface Plasmon Resonance in VO2 Nanorods", Optics Letters, Aug. 1, 2002, vol. 27, No. 15, pp. 1327-1329.

G.I. Petrov, et al., "Nonlinear Optical Microscopy Analysis of Ultrafast Phase Transformation in Vanadium Dioxide", Optics Letters, Apr. 15, 2002, vol. 27, No. 8, pp. 655-657.

(56) References Cited

OTHER PUBLICATIONS

Matteo Rini, et al., "Photoinduced Phase Transition in VO2 Nanocrystals: Ultrafast Control of Surface-Plasmon Resonance", Optics Letters, vol. 30, No. 5, Mar. 1, 2005, pp. 558-560.
H.S. Choi, et al., "Mid-Infrared Properties of a VO2 Film Near the Metal-Insulator Transition", Physical Review, vol. 54, No. 7, Aug. 15, 1996, pp. 4621-4628.
R. Lopez, et al., "Size Effects in the Structural Phase Transition of VO2 Nanoparticles", Physical Review B, vol. 65, 200, pp. 1-5.
A. Cavalleri, et al., "Picosecond Soft X-Ray Absorption Measurement of the Photoinduced Insulator-to-Metal Transition in VO2", Physical Review, 2004, pp. 1-4.
A. Cavalleri, et al., "Evidence for a Structurally-Driven Insulator-to-Metal Transition in VO2: A View from the Ultrafast Timescale", Physical Review, 2004, pp. 1-4.
E.U. Donev, et al, "Optical Properties of Subwavelength Hole Arrays in Vanadium Dioxide Thin Films", Physical Review, 2006, pp. 1-4.
F.J. Morin, "Oxides Which Show a Metal-To-Insulator Transition at the Neel Temperature", Physical Review Letters, vol. 3, No. 1, Jul. 1, 1959, pp. 34-36.
A.S. Barker, et al., "Infrared Optical Properties of Vanadium Dioxide above and Below the Transition Temperature", Physical Review Letters, vol. 17, No. 26, Dec. 26, 1966, pp. 1286-1289.
Ramakant Srivastava et al., "Raman Spectrum of Semiconducting and Metallic VO2", Physical Review Letters, vol. 27, No. 11, Sep. 13, 1971, pp. 727-730.
A. Cavalleri, et al., "Femtosecond Structural Dynamics in VO2 During an Ultrafast Solid-Solid Phase Transition", Physical Review Letters, vol. 87, No. 23, Dec. 3, 2001, pp. 1-4.
R. Lopez, et al., "Size-Dependent Optical Properties of VO2 Nanoparticle Arrays", Physical Review Letters, vol. 93, No. 17, Oct. 22, 2004, pp. 1-4.
A. Cavalleri, et al., "Band-Selective Measurements of Electron Dynamics in VO2 Using Femtosecond Near-Edge X-Ray Absorption", Physical Review Letters, Aug. 5, 2005, pp. 1-4.
English Translation of Official Action for JP 2011-135746, dated Feb. 25, 2013.
C. Kubler, et al, "Coherent Structural Dynamics and Electronic Correlations During an Ultrafast Insulator-to-Metal Phase Transition in VO2", Physical Review Letters, Sep. 14, 2007, pp. 1-4.
Jyrki Lappalainen, et al, "Microstructure Dependent Switching Properties of VO2 Thin Films", Elsevier, ScienceDirect, 2007, pp. 250-255.
Andriy Romanyuk, et al, "Temperature-Induced Metal-Semiconductor Transition in W-doped VO2 Films Studied by Photoelectron Spectroscopy", Elsevier, ScienceDirect, 2007, pp. 1831-1835.
B. Fisher et al., "The Metal-Semiconductor Transition Temperatures in Vanadium Oxides", Solid State Communications, vol. 33, 1979, pp. 965-967.
V.A. Klimov et al., "Hysteresis Loop Construction for the Metal-Semiconductor Phase Transition in Vanadium Dioxide Films", Solid-State Electronics, 2002, pp. 1134-1139.

* cited by examiner

US 8,655,189 B2

OPTICAL MODULATION UTILIZING STRUCTURES INCLUDING METAMATERIALS

BACKGROUND

Modulation of an optical signal facilitates the transmission of optical data from one source or location to another source or location, and this form of communication can be useful for a variety of different applications.

Known systems for modulating an optical signal include the use of multiple quantum well (MQW) modulators, liquid crystal (LC) modulators, or systems employing other techniques in which one or more mirror reflectors are mechanically manipulated or tilted with respect to the incoming signal to achieve a modulation of the signal.

While the techniques described above can be useful for modulating an incoming signal, they are limited in that they can be costly to manufacture and unable to achieve modulation rates at frequencies in the gigahertz range or even greater.

It is desirable to provide an optical modulating device that is easy and relatively inexpensive to manufacture and that provides modulation at high rates (for example, to facilitate use for high bandwidth communications applications).

SUMMARY

In accordance with an embodiment of the present invention, an optical modulation system comprises a metamaterial structure configured to receive and process an input optical signal at an operational wavelength, where the metamaterial structure changes between a transmissive state and a non-transmissive state with respect to the optical signal at the operational wavelength in response to an external stimulus applied to the metamaterial structure. An external stimulus source is coupled with the metamaterial structure and is configured to change the metamaterial structure between its transmissive and non-transmissive states by applying selected stimulus pulses to the metamaterial structure. The optical modulation system processes the input optical signal to output a modulated optical signal that modulates in correspondence with the selected pulses applied to the metamaterial structure.

A non-limiting example of a suitable metamaterial for use in forming the metamaterial structure is an oxide of vanadium (such as vanadium dioxide).

In accordance with another embodiment of the invention, an optical communications system comprises a first station configured to receive an input signal at an operational wavelength from a second station. The process station comprises a metamaterial structure configured to receive and process the input optical signal at the operational wavelength, where the metamaterial structure changes between a transmissive state and a non-transmissive state with respect to the optical signal at the operational wavelength in response to an external stimulus applied to the metamaterial structure, and an external stimulus source that is coupled with the metamaterial structure and is configured to change the metamaterial structure between its transmissive and non-transmissive states by applying selected stimulus pulses to the metamaterial structure. The optical communications system processes the input optical signal and outputs a modulated optical signal that modulates in correspondence with the selected pulses applied to the metamaterial structure.

In accordance with a further embodiment of the invention, a method of modulating an optical signal comprises receiving an input optical signal at an operational wavelength at a first station, directing the received input optical signal toward a metamaterial structure, applying external stimulus pulses to the metamaterial structure so as to change an optical state of the metamaterial structure between a transmissive state and a non-transmissive state with respect to the optical signal at the operational wavelength, generating a modulated optical signal from the input optical signal directed toward the metamaterial structure, wherein the modulated optical signal is modulated in correspondence with the external stimulus pulses applied to the metamaterial structure, and transmitting the modulated optical signal to a second station.

The optical limiting structure of the present invention provides a number of advantages including, without limitation, rapid switching of the metamaterial to facilitate a corresponding rapid modulation of the optical signal, the ability to process optical signals over a wide wavelength range, providing high modulation contrast ratios for optical signals being processed by the metamaterial structures, and the ability to process different signals using separate wavelength regions simultaneously.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

Figure 1A:
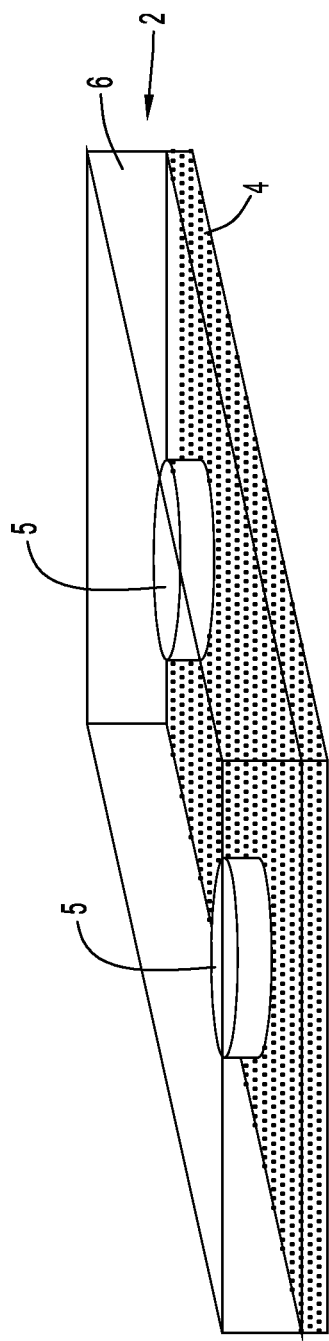
FIGS. 1A and 1B are schematic representations of a metamaterial structure in accordance with the invention.

In accordance with the present invention, modulation of an optical signal is achieved utilizing an optical modulation device comprising a metamaterial or phase-change material structure that can be switched between transmissive and non-transmissive states with respect to light beam or optical signal at a particular wavelength. The metamaterial undergoes a reversible change in physical state when subjected to an external stimulus. The change in physical state of the metamaterial structure modifies the optical properties of the metamaterial with regard to its ability to transmit or block light at one or more particular wavelengths. The modulation of an optical signal utilizing the metamaterial structure is useful for optical communications between two or more sources or locations.

Suitable metamaterials (also referred to as phase-change materials) utilized to form the optical modulating structure include, without limitation, thermochromic or photochromic materials that undergo reversible phase transitions upon being heated above a critical temperature. The phase transition is reversible (i.e., the material changes back to its original physical state) in response to being cooled to a sufficient temperature below the critical temperature. The change between physical states of certain metamaterials can be very rapid (e.g., as quickly as 75 femtoseconds for $VO_2$), which allows for very high modulation rates of the optical signal on the order of several hundred GHz or greater (e.g., for $VO_2$, the modulation rate can be as high as 6.7 THz, assuming that the device is primarily limited by the transition time of the material). The metamaterial structures also facilitate providing lower modulation rates for an optical signal based upon a particular application, including modulation rates of at least about 100 MHz, or even lower modulation rates.

Examples of suitable thermochromic materials that can be used to form the optical modulating structure include, without limitation, metal oxide-based materials such as $WO_3$, $VO_2$, $V_2O_3$, $Ti_2O_3$, $NiS_{2-y}Se_y$, $LaCoO_3$, $PrNiO_3$, $Cd_2Os_2O_7$, $NdNiO_3$, $Tl_2Ru_2O_7$, NiS, $BaCo_{1-y}Ni_yS_2$ (where y≤1), $Ca_{1-y}Sr_yVO_3$ (where y≤1), $PrRu_4P_{12}$, $BaVS_3$, $EuB_6$, $Fe_3O_4$, $La_{1-y}Ca_yMnO_3$ (where y≤1), $La_{2-2}Sr_{1+2}Mn_2O_7$ (where y≤1), $Ti_4O_7$ and $La_2NiO_4$, mixed oxides of the manganite type $RE_xAE_{1-x}MnO_3$ (where RE is a rare-earth metal such as lanthanum or praseodymium, AE is an alkaline-earth metal such as calcium, and x≤1), intermetallics (such as NiAl), and any combinations of these compounds. Other suitable thermochromic materials include polymers such as azobenzene-containing polydiacetylenes, polyvinylidene fluoride, polyvinyl acetate, polyvinyl phenylene, polystyrene sulfonate, polyanilines (e.g., polyanilines doped into synthetic opal nanostructures), and nanostructured polymers such as diblock (e.g., poly[styrene-b-isoprene] or PS-b-PI) and triblock (e.g., a rod-coil copolymer poly[poly(N-isopropylacrylamide)-b-polyfluorene-b-poly(N-isopropylacrylamide)]) copolymers.

An example of a suitable metamaterial for use in an optical modulating structure is an oxide of vanadium, such as vanadium dioxide. Vanadium oxides have a variety of different oxide forms, including $VO_2$ and $V_2O_3$. Vanadium dioxide, $VO_2$, undergoes a reversible transition from a semiconductor phase (where the $VO_2$ has a monoclinic crystal structure) to a metal phase (where the $VO_2$ has a tetragonal crystal structure) at a first critical temperature of about 68° C. The transitional phase change at this critical temperature results in the $VO_2$ exhibiting a rapid change (as quickly as 75 femtoseconds) in both electrical and optical properties. At this temperature-induced phase transition between semiconductor (cool) phase and metal (hot) phase, $VO_2$ acts as an optical "blocker" that substantially limits or blocks the transmittance of light at near-infrared (near-IR) wavelengths of 1.2 micrometers (microns). When the temperature of $VO_2$ drops below a second critical temperature less than 68° C., it rapidly transitions back to its original, semiconductor state and facilitates transmittance of light at the near-IR wavelengths.

In addition, certain dopants can be combined with a metamaterial to achieve a shift or change in the critical temperature at which the metamaterial transitions so as to block or limit transmittance of light at one or more selected wavelengths. Examples of suitable dopants include, without limitation, tungsten, fluorine, titanium, chromium, and combinations thereof, where the dopant or combinations of dopants are provided within the thermochromic material at concentrations ranging from about 0.05 atomic % to about 5 atomic %. For example, $VO_2$ can be doped with a dopant such as tungsten to lower the critical temperature at which the $VO_2$ compound transitions from semiconductor phase to metal phase from about 68° C. to temperatures as low as room temperature (e.g., about 27° C.) or lower.

It is further possible to achieve a shift or to tune the wavelength of the metamaterial such that the metamaterial is able to substantially limit or block light at a variety of different wavelengths ranging from about 250 nm to about 15 microns. For example, as described in co-pending U.S. patent application Ser. No. 12/479,311, the disclosure of which is incorporated herein by reference in its entirety, it has been discovered that the operational wavelength at which a metamaterial typically blocks or substantially limits the transmittance of light when switched to a non-transmissive state can be modified and fine tuned to a particular wavelength or wavelength range, where the shift can be by at least about 150 nm. This shift and fine-tuning of the operational wavelength at which the metamaterial is non-transmissive to light can be achieved by forming structures comprising a combination of certain materials with metamaterials and arranging the structures in certain geometrical patterns or arrays.

In particular, metamaterial structures can be formed comprising a layered structure in which a metamaterial or phase-change material layer is provided over a layer comprising one or more nano-sized particles. The metamaterial layer can be provided over a layer comprising a patterned array of nano-sized particles comprising one or more metals such as gold, platinum, palladium, silver, copper and aluminum, and any combinations, alloys (e.g., a gold/silver alloy, a gold/copper alloy, etc.), and/or oxides (e.g., silver oxide) of such metals. Metamaterial structures can be formed with any selected combinations of nano-sized particle layers and/or metamaterial layers. In one example, an metamaterial structure can be formed with a metamaterial layer disposed over a layer comprising an array of nano-sized particles (e.g., metal and/or metal oxide particles). In another example, a metamaterial structure can be formed with a nano-sized particle layer disposed over a metamaterial layer. In a further example, a metamaterial structure can be formed with a layer comprising an array of nano-sized particles disposed or "sandwiched" between two films or layers of metamaterial, where each metamaterial layer can include the same or different one or combination of metamaterials. In still another example, the metamaterial can be formed over surface portions of nano-sized particles, where the spaces between nano-sized particles remain uncovered by the metamaterial such that a series of metamaterial layers are formed either over individual particles (so as to form a "hat" or partial covering over a portion of each nano-sized particle) or over sets of particles with uncovered spaces remaining between the covered particles or the sets of covered particles.

The nano-sized particles may comprise one or more metals or metal oxides preferably having cross-sectional dimensions (e.g., length, width, thickness and/or diameter dimensions) on the order of no greater than about 1000 nanometers (nm), more preferably no greater than about 500 nm, and even more preferably no greater than about 300 nm. The selection of a number of different parameters, including different metamaterials and different metals, different layer thicknesses, different sizes, shapes and/or arrangements of nano-sized (e.g., metal or metal oxide) particle arrays results in a fine tuning of the wavelength at which the resultant structure can function as an optical blocker or substantially block light at a desired wavelength, where the fine tuning of the wavelength can occur over a range from about 250 nm to about 15 microns.

As an example, $VO_2$ can be switched between a semiconductor phase and a metal phase to act as an optical blocker at wavelengths of 1.2 microns. A $VO_2$ layered structure can be formed in which the optical blocking properties of $VO_2$ are set so as to block or substantially limit the transmission of light at wavelengths beyond the IR or near-IR range of 1200 nm to operational wavelengths greater than 1.2 microns (such as at least about 1.4 microns). Vanadium dioxide structures can also be formed in which the $VO_2$ structure is switched between transmissive and non-transmissive states with respect to light at wavelengths blue-shifted to the visible range (about 800 nm to about 400 nm) and also the UV range (less than 400 nm). Other metamaterial structures can also be formed in which the metamaterial is configured or fine tuned to shift the wavelength at which the metamaterial exhibits optical blocking features in its non-transmissive state with respect to light in the same or similar wavelength regions as noted above for $VO_2$. The methods of forming such structures are described in detail in U.S. patent application Ser. No. 12/479,311.

Rapid switching of the metamaterial structures between optically transmissive and non-transmissive states can be achieved utilizing any suitable external stimulus that achieves a rapid switch of the metamaterial between different optical states of the metamaterial. For thermochromic materials such as $VO_2$, a suitable heat source can be utilized that rapidly heats the material to a temperature that results in a switch between optically transmissive and non-transmissive states of the material.

Figure 1B:
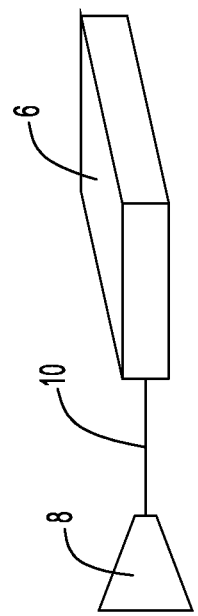

In one example embodiment, a resistive heating source can be integrated within a metamaterial structure to achieve rapid heating of the metamaterial as shown in FIG. 1A. In particular, a layered structure 2 includes a substrate 4 upon which a stimulus material is deposited, e.g., in an array of structures 5, and with a metamaterial structure 6 being deposited over substrate 4 and stimulus material 5. The substrate 4 and stimulus material 5 comprise suitable materials to serve as a resistive heating structure that heats metamaterial structure 6 when a current is applied to the substrate 4. In another example embodiment shown in FIG. 1B, a light energy source 8 (such as a laser source) can be utilized to direct light energy (shown as beam 10) toward the metamaterial structure 6 so as to irradiate and rapidly heat the structure to change its optical transmissive state. It is noted that the metamaterial structure 6 can comprise a metamaterial or a metamaterial in combination with metal or metal oxide particles such as arrays of nano-sized metal or metal oxide particles. Selection of the substrate material affects the nature of both the transmissive and non-transmissive states.

The external stimulus can be pulsed (e.g., a pulsed current for the embodiment of FIG. 1A, or a pulsed light beam for the embodiment of FIG. 1B) at a rapid pace to achieve a resultant rapid switch between optically transmissive and non-transmissive states of the metamaterial. Such rapid switching of the optical transmissive/non-transmissive states of the metamaterial can be utilized to provide rapid modulation of an optical signal transmitted toward the metamaterial. In other words, modulation of an optical signal can be achieved via modulation of the transmittance of the metamaterial.

The metamaterial structure will preferably be selected to have a high transmissivity so that the structure is substantially transparent to light at a selected or operational wavelength when the metamaterial is in its optically transmissive state. The metamaterial structure will also preferably be substantially opaque and/or reflective and thus have low transmissivity to light at the operational wavelength when the metamaterial is in its non-transmissive state. The metamaterial structure can further be designed such that the metamaterial is in its transmissive state prior to being stimulated by an external stimulus source and is in its non-transmissive state upon being stimulated by the external stimulus source. Alternatively, the metamaterial structure can be designed such that the metamaterial is in its non-transmissive state prior to being stimulated by the external stimulus source and is in its transmissive state upon being stimulated by the external stimulus source.

When using $VO_2$ to form the metamaterial structure, the metamaterial structure can be designed to have a transmittance of at least about 95% when $VO_2$ is in its transmissive state and a transmittance of no greater than about 0.01% when $VO_2$ is in its non-transmissive state. Other metamaterials can also be selected having the same or similar transmittance values when in the transmissive and non-transmissive states. Transmittance, as used herein, is defined as the ratio of the amount of light emerging from the metamaterial structure at a specified or operational wavelength to the intensity of light directed toward the same structure at the same wavelength, and is provided as a decimal percentage. Such characteristically large changes in the transmittance between the transmissive and non-transmissive states can be achieved for a broad range of operational wavelengths ranging from about 250 nm to about 15 microns, where the operational wavelength for a metamaterial structure layer has been fine tuned in accordance with techniques such as those described in U.S. patent application Ser. No. 12/479,311.

One measure of performance of an optical modulator is the modulation contrast ratio (MCR), which is defined as the ratio of transmittance of a material in its transmissive state with respect to light at an operational wavelength to the transmittance of the material in its non-transmissive state with respect to light at the operational wavelength. Optical modulating devices can be formed in accordance with the invention, utilizing a suitable metamaterial structure (such as a $VO_2$ structure), where the metamaterial structure and the optical modulating device have an MCR value of at least 1000 and in many embodiments significantly greater than 1000. Modulation contrast ratio values of $10^6$ or greater can be achieved, for example, in embodiments in which an optical signal passes through the metamaterial structure two or more times during modulation processing of the optical signal.

The metamaterial structure can be incorporated into any number of different optical modulation devices, such as optical modulation devices utilized in communication systems. In the following example embodiments, optical modulation devices utilizing metamaterial structures are described for use in asymmetric communications.

Figure 2A:
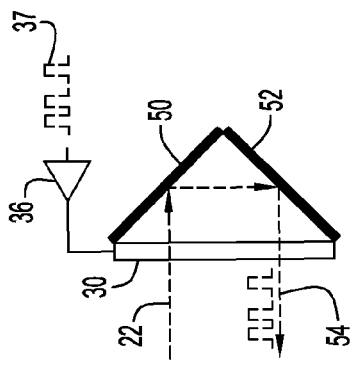
FIGS. 2A-2D are schematic representations of asymmetric communications systems incorporating an optical modulation device in accordance with the present invention.

An asymmetric optical communication system is schematically depicted in FIG. 2A, including a base station with a transmitter 20 (e.g., a laser) that transmits an input beam of light or optical signal 22 at an operational wavelength to a remote station (comprising elements 30, 32, 34, 36 and 37) and a receiver 40 that receives and processes an optical signal 38 that is modulated by an optical modulation device at the remote station. The optical modulation device includes a retroreflector consisting of two reflecting surfaces 32, 34 that are configured to substantially reflect the optical signal at the operational wavelength. The reflecting surface structures of the retroreflector described herein may be constructed of any suitable material(s) that facilitates reflection of an optical signal at the operational wavelength including, without limitation, glass, plastic, silicon and combinations thereof. In FIG. 2A, the reflecting surfaces 32, 34 are arranged in a corner-cube retroreflector geometric configuration so as to provide an optical signal reflection pathway back toward the receiver 40 at the base station. A metamaterial structure 30 is provided on the first reflective surface 32 of retroreflector that receives the input optical signal 22. The metamaterial structure 30 can be of the types described above and depicted in FIG. 1A or FIG. 1B.

An external stimulus source 36 is coupled with metamaterial structure 30 and provides a pulsed stimulus 37 to the metamaterial structure (e.g., a pulsed current for the embodiment of FIG. 1A, or a pulsed energy beam for the embodiment of FIG. 1B) which rapidly switches the metamaterial between transmissive and non-transmissive states (i.e., a rapid shuttering of the metamaterial with respect to the optical signal at the operational wavelength). In other words, when the metamaterial is switched to its transmissive state, the optical signal 22 is transmitted through the metamaterial for reflection by surface 32. When the metamaterial is switched to its non-transmissive state, the optical signal 22 is effectively blocked or prevented from passing through the metamaterial structure. This results in the generation of a modulated optical signal 38 that corresponds with the modulation or switching of the metamaterial structure 30 between its transmissive and non-transmissive states by the external stimulus source 36. The modulated optical signal 38 is directed from reflecting surface 32 toward reflecting surface 34 and then directed back to the receiver 40 at the base station. As can be seen from FIG. 2A, the optical signal must pass through metamaterial structure 30 two times prior to propagation toward the second reflecting surface 34.

The optical modulation device can be modified in any number of different configurations, including providing metamaterial structures on reflective surfaces of one or more retroreflectors to generate the modulated optical signal. Some additional examples are shown in FIGS. 2B-2D, but it is noted that other configurations are also possible.

Figure 2B:
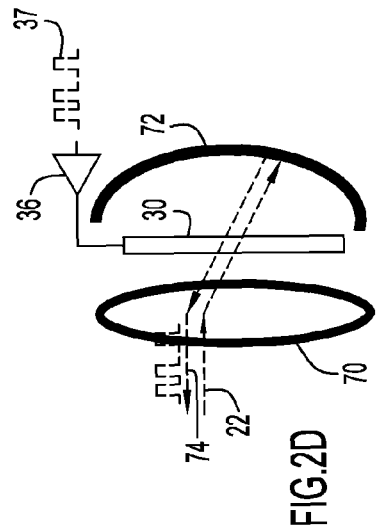

Referring to FIG. 2B, the optical modulation device includes a retroreflector comprising of a pair of reflecting surfaces 50, 52 arranged in a corner geometry with respect to the transmitter and receiver of the base station that is similar to that shown in FIG. 2A. A metamaterial structure 30 is provided in the optical pathway between the retroreflector 50, 52 and input optical signal 22 such that the optical signal being processed must pass through metamaterial structure 30 a first time prior to being reflected by the retroreflector and also a second time prior to being transmitted (as the modulated signal 54) to the receiver at the base station. An external stimulus source 36 is coupled with the metamaterial structure 30 in the same manner as described for FIG. 2A to modulate the metamaterial between transmissive and non-transmissive states with respect to the optical signal at the operational wavelength.

Figure 2C:
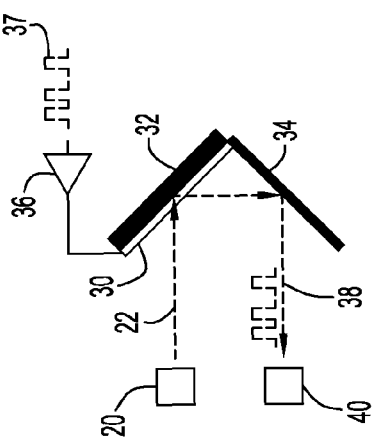

In the embodiment of FIG. 2C, the optical modulation device includes a reflector 60 and a metamaterial structure 30 applied to its reflective surface (including external stimulus source 36 coupled with metamaterial structure 30). The first reflector 60 is arranged to receive and reflect the input optical signal 22 at the operational wavelength from the transmitter at the base station. Second and third reflective surfaces 62, 64 are arranged as a retroreflector in a corner geometry with respect to the first reflector 60. This retroreflector comprising reflective surfaces 62, 64 receives the optical signal from and then transmits such signal back to the first reflector 60, where such signal is then reflected a second time by reflector 60 to the receiver at the base station. The processed optical signal (which is transmitted to the base station receiver as modulated output signal 66) must therefore pass through metamaterial structure 30 four times prior to being directed back toward the receiver at the base station.

Figure 2D:
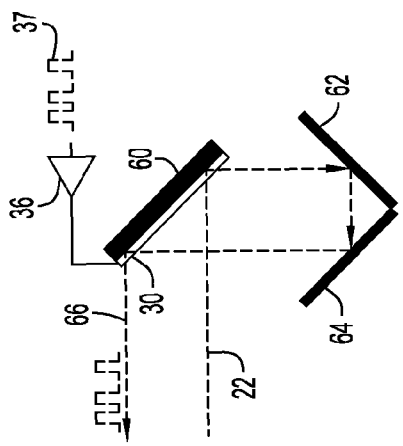

The modulation device of FIG. 2D comprises a "cat's eye" retroreflector configuration in which a lens 70 is combined with a concave or hemispherical reflector 72. A metamaterial structure 30 (including external stimulus source 36 coupled with the metamaterial structure) is placed within the optical pathway between lens 70 and reflector 72. The lens 70 focuses the input optical signal 22 from the base station transmitter onto reflector 72, and reflector 72 then reflects the signal back through the lens 70 to the base station receiver. The metamaterial structure 30 processes the signal such that it is returned to the base station receiver as modulated signal 74. The processed signal in the embodiment of FIG. 2D passes through metamaterial structure 30 two times.

In each of the two-pass configurations described in the embodiments of FIGS. 2A, 2B and 2D (where the processed optical signal must pass through the metamaterial structure two times), an MCR value for the modulated optical signal can be in the range of at least about $10^6$, particularly if a metamaterial such as $VO_2$ is used for the metamaterial structure. For the four-pass configuration of FIG. 2C (where the processed optical signal must pass through the metamaterial four times), the MCR value for the modulated optical signal can be in the range of at least about $10^{12}$.

In addition, as noted above, the metamaterial structure can be designed such that the operational wavelength of the optical signal to be modulated can be selected from a broad range from about 250 nm to about 15 microns, including a range greater than 1.2 microns. This allows one to choose a particular wavelength or wavelength range for operation based upon a particular application. For example, in satellite communications, it is important to be able to operate within an appropriate optical window of wavelengths that facilitates transmission of optical signals through the atmosphere between a ground based station and a space station. For other applications in which human safety concerns are an issue (e.g., eye safety), metamaterial structures can be designed that modulate optical signals at operational wavelengths of at least about 1.4 microns. The ability of metamaterial structures of the present invention to shutter light at operational wavelengths greater than 1.2 microns facilitates the modulation of an optical signal in the various IR bands that are used for optical communications (such as the C-band range which is 1530 nm-1565 nm).

In each of the embodiments described above in FIGS. 2A-2D, the modulated optical signal is generated or defined by light that is transmitted through the metamaterial when the metamaterial is in its transmissive state. In addition, the metamaterial structure for the embodiments of FIGS. 2A-2D is configured so as to have little or no reflectivity with respect to the optical signal when in its non-transmissive state. However, it is noted that the present invention is not limited to optical modulation of light that is transmitted through the metamaterial structure.

Instead, optical signal modulation can be achieved utilizing the pulsed portions of the optical signal that do not pass through but instead are reflected by the metamaterial structure. The metamaterial structure can be constructed to have a suitable reflectivity with respect to the optical signal at the operational wavelength when the metamaterial structure is in its non-transmissive state. In this type of embodiment, an optical modulation device can be constructed such that optical modulation of the signal is achieved via use of the portions of the optical signal that are reflected by the metamaterial structure when the metamaterial structure is in its non-transmissive state. For each of the embodiments of FIGS. 2A and 2C, a metamaterial structure having suitable reflectivity in its non-transmissive state can be utilized by itself instead of using a combined metamaterial/retroreflector (referring to combined structure 30/reflector 32 of FIG. 2A, and combined structure 30/reflector 60 of FIG. 2C) when the modulated optical signal is generated using signal portions that are reflected by the metamaterial structure. This eliminates the need for additional retroreflector components for the device.

In another embodiment of the invention, an optical modulator device can generate an optical signal directly from the device instead of receiving and reflecting an optical signal provided from another source. In particular, the optical modulator device can include a transmitter to direct an optical signal at a selected operational wavelength toward a metamaterial structure (such as metamaterial structures described above), where the optical properties of the metamaterial structure are rapidly switched to facilitate modulation of the optical signal for propagation to another source or location.

A further feature of the optical modulator device is the provision of an optical trap or filter that captures and contains the portions of the signal that are removed from the modulated signal to be transmitted to the receiving source (i.e., the source that is remote from the optical modulator device) in the communication process. In certain optical communication applications (e.g., military or other operations) where secrecy of location of the optical modulator device is of significant importance, it is desirable to prevent the portion of the optical signal that forms no part of the modulated optical signal from being visible to other individuals or entities. Any one or more types of optical beam dumps, absorptive filters and/or other suitable devices capable of substantially absorbing and/or capturing unused or discarded portions of the optical signal can be provided as part of the optical modulator device to ensure that substantially only the modulated optical signal is transmitted and that the unused portions of the optical signal are substantially prevented from propagating away from the device. For example, a number of different types and geometries of optical beam dumps are commercially available and suitable for use with an optical modulation device of the invention, where selection of a specific type and geometry of the optical beam dump will depend upon the specific design, geometry and arrangement of reflective and metamaterial structure components within the optical modulation device.

As noted above, a suitable metamaterial structure can be constructed that facilitates rapid switching of the metamaterial between transmissive and non-transmissive states on the order of picoseconds or even femtoseconds. This results in a corresponding rapid modulation of the optical signal, which is particularly useful for high bandwidth communications where the frequency of the modulated optical signal can be up to the limit of the metamaterial (in the case of $VO_2$, 75 femtosecond material switching, corresponding to a modulation frequency of about 6.7 THz).

The optical modulation device can be implemented as part of a remote station as in the embodiments of FIGS. 2A-2C, where an incoming or input optical signal at an operating wavelength is transmitted from a base location to the remote station, the optical signal is processed by the optical modulation device and a modulated optical signal is output and transmitted from the remote station back to the base station. In such an embodiment, the optical modulation device can be configured as a lightweight, hand-held unit that is easily employed by an operator for military or other ground-based communication applications.

Alternatively, as noted above, the optical modulation device can be equipped with its own transmitter that generates the optical signal at the operating wavelength and modulates the optical signal for transmission to another location. This configuration is suitable for a number of applications, including communications applications between ground-based and satellite-based or other aerospace locations.

In another embodiment, an optical modulation device can be constructed in accordance with the invention in which the device is capable of modulating two or more input optical signals having the same or different wavelengths. For example, the optical modulation device can include two or more different metamaterial structures or two or more sections of a single metamaterial structure being tuned for processing an optical signal at different wavelengths and/or switching between transmissive and non-transmissive states in response to being subjected to different stimuli. This can be accomplished in a number of different ways, such as utilizing different metamaterials and/or different combinations of metamaterials with nanostructures (such as nano-sized metal or metal oxide particle layers) within the optical modulation device. Two or more output optical signals can also be generated which are modulated at different rates to provide separate sets of communication information from the same optical modulation device to another location.

As can be readily appreciated from the disclosure herein, certain features such as the operational wavelength(s) at which the optical modulation device can modulate an optical signal, the frequency of such modulation, modulation contrast ratio that is achieved, etc. will depend upon a number of factors including, without limitation, the types of metamaterials used, the types and configurations of nanostructures combined with the metamaterials, and the number, types and placement of stimulus materials used to achieve a switch of the optical state of the metamaterials. The present invention facilitates a number of different types of optical modulation devices that employ the use of metamaterials.

The metamaterial structures used to achieve the modulation of an optical signal in the optical modulation device are relatively easy to manufacture and simplify the design and construction of the optical modulation device in relation to other known optical modulation devices (such as those employing MQW structures, liquid crystal structures, etc.). The metamaterial structures further achieve high MCR values and can be designed to be provide modulation of optical signals over a wide range of wavelengths including, without limitation, IR (including, e.g., eye-safe light ranges) and near-IR regions, visible light regions, and ultraviolet regions.

Having described example embodiments of an optical limiting structure or device and methods of forming the optical limiting structure, variations and changes will be suggested to those skilled in the art in view of the teachings set forth herein. It is therefore to be understood that all such variations, modifications and changes are believed to fall within the scope of the present invention as defined by the appended claims.

What is claimed:

1. An optical modulation system comprising:
a metamaterial structure configured to receive and process an input optical signal at an operational wavelength, wherein the metamaterial structure changes between a transmissive state and a non-transmissive state with respect to the optical signal at the operational wavelength in response to an external stimulus applied to the metamaterial structure, and the metamaterial structure comprises a first layer comprising a thermochromic material and a second layer comprising metal particles, the second layer of particles comprising at least one of gold, platinum, palladium, silver, copper and aluminum; and an external stimulus source that is coupled with the metamaterial structure and is configured to change the metamaterial structure between its transmissive and non-transmissive states by applying selected stimulus pulses to the metamaterial structure;

wherein the optical modulation system processes the input optical signal to output a modulated optical signal that modulates in correspondence with the selected pulses applied to the metamaterial structure.

2. The system of claim 1, wherein the metamaterial structure comprises at least one of $VO_2$, $V_2O_3$, $Ti_2O_3$, $NiS_{2-y}Se_y$, $LaCoO_3$, $PrNiO_3$, $Cd_2Os_2O_7$, $NdNiO_3$, $Tl_2Ru_2O_7$, $NiS$, $BaCo_{1-y}Ni_yS_2$, $Ca_{1-y}Sr_yVO_3$, $PrRu_4P_{12}$, $BaVS_3$, $EuB_6$, $Fe_3O_4$, $La_{1-y}Ca_yMnO_3$, $La_{2-2y}Sr_{1+2y}Mn_2O_7$, $Ti_4O_7$ and $La_2NiO_4$, where $y \leq 1$, an azobenzene-containing polydiacetylene, polyvinylidene fluoride, polyvinyl acetate, polyvinyl phenylene, polystyrene sulfonate, and a polyaniline doped into opal nanostructures.

3. The system of claim 1, wherein the system is configured to generate the modulated optical signal utilizing portions of the input optical signal obtained when the metamaterial structure is in one of the transmissive state and the non-transmissive state, and the system is further configured to prevent other portions of the input optical signal that form no part of the modulated optical signal from propagating from the system.

4. The system of claim 1, wherein the metamaterial structure comprises $VO_2$.

5. The system of claim 1, wherein the operational wavelength is greater than 1.2 microns.

6. The system of claim 1, further comprising:
at least one reflective surface, wherein the metamaterial structure is provided over the at least one reflective surface.

7. The system of claim 6, further comprising:
at least one retroreflector including the at least one reflective surface.

8. An optical communications system comprising a first station configured to receive an input signal at an operational wavelength from a second station, the first station comprising:
a metamaterial structure configured to receive and process the input optical signal at the operational wavelength, wherein the metamaterial structure changes between a transmissive state and a non-transmissive state with respect to the optical signal at the operational wavelength in response to an external stimulus applied to the metamaterial structure, and the metamaterial structure comprises a first layer comprising a thermochromic material and a second layer comprising metal particles, the second layer of particles comprising at least one of gold, platinum, palladium, silver, copper and aluminum; and
an external stimulus source that is coupled with the metamaterial structure and is configured to change the metamaterial structure between its transmissive and non-transmissive states by applying selected stimulus pulses to the metamaterial structure;
wherein the optical communications system processes the input optical signal and outputs a modulated optical signal that modulates in correspondence with the selected pulses applied to the metamaterial structure.

9. The system of claim 8, wherein the system is configured to generate the modulated optical signal utilizing portions of the input optical signal obtained when the metamaterial structure is in one of the transmissive state and the non-transmissive state, and the system is further configured to prevent other portions of the input optical signal that form no part of the modulated optical signal from propagating from the first station.

10. The system of claim 8, wherein the system is configured to generate the modulated optical signals utilizing portions of the input optical signal obtained when the metamaterial structure is in the transmissive state.

11. The system of claim 8, further comprising:
at least one reflective surface, wherein the metamaterial structure is provided over the at least one reflective surface.

12. The system of claim 8, further comprising:
a retroreflector comprising a plurality of reflective surfaces that are arranged to direct the output modulated signal in a direction toward the second station.

13. The system of claim 9, wherein the metamaterial structure comprises at least one of $VO_2$, $V_2O_3$, $Ti_2O_3$, $NiS_{2-y}Se_y$, $LaCoO_3$, $PrNiO_3$, $Cd_2Os_2O_7$, $NdNiO_3$, $Tl_2Ru_2O_7$, NiS, $BaCo_{1-y}Ni_yS_2$, $Ca_{1-y}Sr_yVO_3$, $PrRu_4P_{12}$, $BaVS_3$, $EuB_6$, $Fe_3O_4$, $La_{1-y}Ca_yMnO_3$, $La_{2-2y}Sr_{1+2y}Mn_2O_7$, $Ti_4O_7$ and $La_2NiO_4$, where $y \leq 1$, an azobenzene-containing polydiacetylene, polyvinylidene fluoride, polyvinyl acetate, polyvinyl phenylene, polystyrene sulfonate, and a polyaniline doped into opal nanostructures.

14. The system of claim 9, wherein the external stimulus source generates heat to modify a temperature of the metamaterial structure resulting in a change between transmissive and non-transmissive states of the metamaterial structure.

15. The system of claim 9, wherein the metamaterial structure comprises $VO_2$.

16. The system of claim 8, wherein the operational wavelength is greater than 1.2 microns.

17. The system of claim 8, wherein the system is configured to generate an output modulated optical signal having a frequency of at least about 100 MHz.

18. A method of modulating an optical signal, the method comprising:
receiving an input optical signal at an operational wavelength at a first station;
directing the received input optical signal toward a metamaterial structure, wherein the metamaterial structure comprises a first layer comprising a thermochromic material and a second layer comprising metal particles, the second layer of particles comprising at least one of gold, platinum, palladium, silver, copper and aluminum;
applying external stimulus pulses to the metamaterial structure so as to change an optical state of the metamaterial structure between a transmissive state and a non-transmissive state with respect to the optical signal at the operational wavelength;
generating a modulated optical signal from the input optical signal directed toward the metamaterial structure, wherein the modulated optical signal is modulated in correspondence with the external stimulus pulses applied to the metamaterial structure; and
transmitting the modulated optical signal to a second station.

19. The method of claim 18, wherein the input optical signal is transmitted from the second station to the first station.

20. The method of claim 18, wherein the metamaterial structure is provided over at least a portion of a reflective surface of a reflector, and the reflector reflects portions of the optical signal when the metamaterial is in the transmissive state.

21. The method of claim 20, wherein the metamaterial structure comprises at least one of $VO_2$, $V_2O_3$, $Ti_2O_3$, $NiS_{2-y}Se_y$, $LaCoO_3$, $PrNiO_3$, $Cd_2Os_2O_7$, $NdNiO_3$, $Tl_2Ru_2O_7$, NiS, $BaCo_{1-y}Ni_yS_2$, $Ca_{1-y}Sr_yVO_3$, $PrRu_4P_{12}$, $BaVS_3$, $EuB_6$, $Fe_3O_4$, $La_{1-y}Ca_yMnO_3$, $La_{2-2y}Sr_{1+2y}Mn_2O_7$, $Ti_4O_7$ and $La_2NiO_4$, where $y \leq 1$, an azobenzene-containing polydiacetylene, polyvinylidene fluoride, polyvinyl acetate, polyvinyl phenylene, polystyrene sulfonate, and a polyaniline doped into opal nanostructures.

22. The method of claim 18, wherein the modulated optical signal is generated utilizing portions of the input optical signal obtained when the metamaterial structure is in one of the transmissive state and the non-transmissive state, and the method further comprises:
preventing other portions of the input optical signal that form no part of the modulated optical signal from propagating from the first station.

23. The method of claim 18, wherein the external stimulus pulses comprise pulses of heat to modify a temperature of the metamaterial structure resulting in a change between transmissive and non-transmissive states of the metamaterial structure.

* * * * *